US005669119A

United States Patent [19]

Seron

[11] Patent Number: 5,669,119

[45] Date of Patent: Sep. 23, 1997

[54] CORD LANYARD

[75] Inventor: Suren V. Seron, Minooka, Ill.

[73] Assignee: Seron Manufacturing Company, Joliet, Ill.

[21] Appl. No.: 687,146

[22] Filed: Jul. 24, 1996

[51] Int. Cl.$^6$ .......... F16L 11/00

[52] U.S. Cl. .......... 24/265 H; 24/115 R; 24/129 R; 24/115 H

[58] Field of Search .......... 24/115 R, 115 K, 24/115 H, 129 R, 136 R, 132 R, 265 H

[56] References Cited

U.S. PATENT DOCUMENTS 4,236,281 12/1980 Bottum .
4,455,717 6/1984 Gray .
5,068,949 12/1991 Horace .
5,136,756 8/1992 Krauss .
5,170,538 12/1992 Zarembo .
5,245,730 9/1993 Martin .
5,283,930 2/1994 Krauss .
5,372,510 12/1994 Stanfield .

*Primary Examiner*—James R. Brittain
*Attorney, Agent, or Firm*—Wood, Phillips, VanSanten, Clark & Mortimer

[57] ABSTRACT

A unitary lanyard fixture made of a resilient plastic having a base section, hollow slider section and breakable connection therebetween. A hook for mounting an element to the lanyard fixture are also on the base section. The flexible lanyard cord is secured to an internal recess of the base section and also extends through the hollow slider section. Piercing prongs extend from this recess to lock the cord in the base section. A locking indentation and clamping hook holds the base section in a closed position. The hollow slider section is slidable on the lanyard cord and is connected by a frangible bridge to the base section.

13 Claims, 3 Drawing Sheets

22 30 12 4 38 16 48 5 14 45 20a 42 34 41 20b 32 36 4 46 5 43 44

22 12 18 16 16 14

22
10
20
3
3
12
16
6
6
14
18

22
30
20a
42
34
41
20b
32
36
12
4
4
38
16
48
46
5
5
14
45
44
43

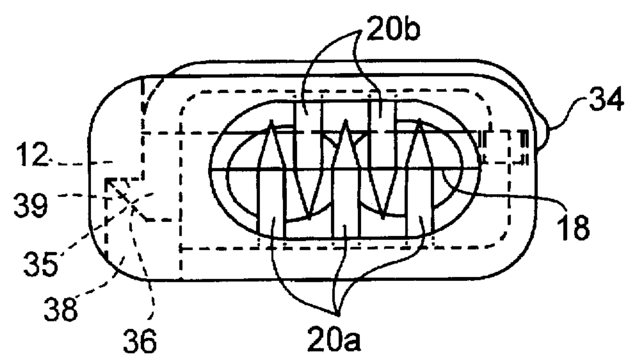
FIG. 3
FIG. 4
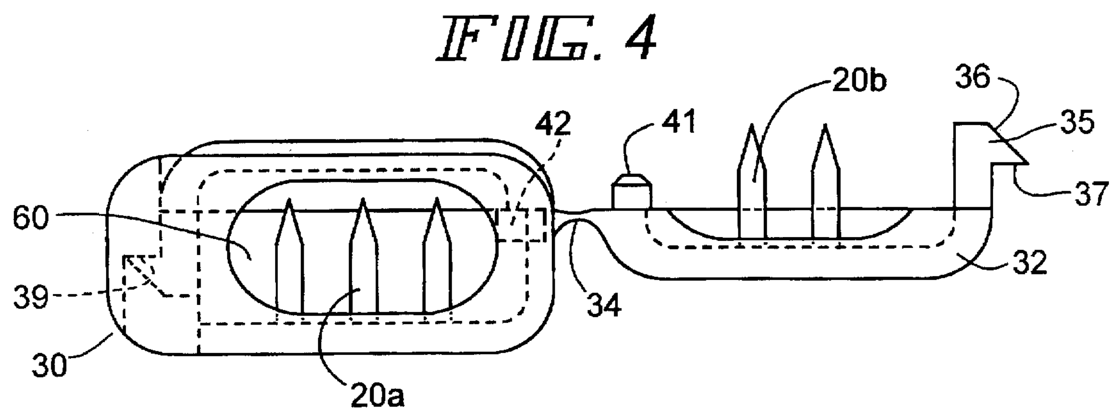
FIG. 5
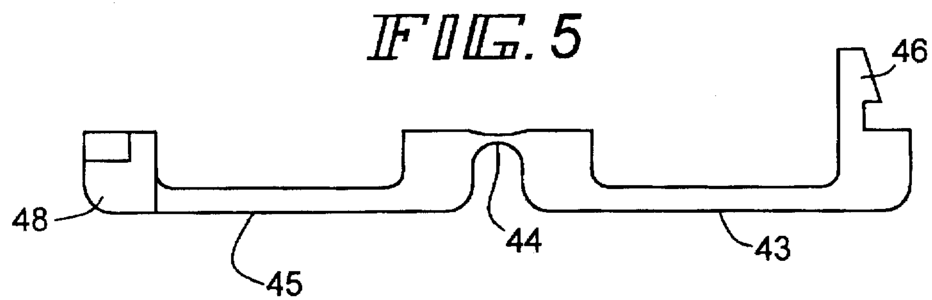
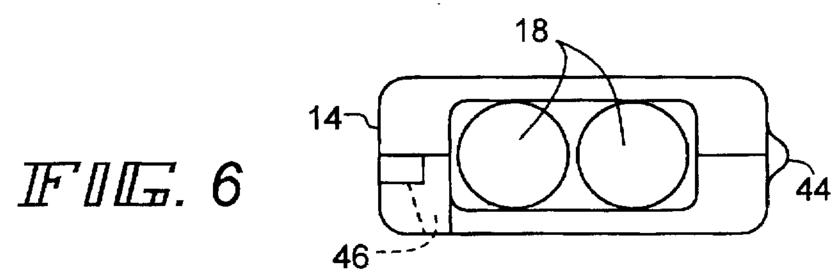
FIG. 6

22
12
18
16
16
14

CORD LANYARD

TECHNICAL FIELD

The present invention is directed toward lanyards, and more particularly, toward lanyard fixtures for fixedly receiving a lanyard cord.

BACKGROUND ART

A lanyard generally has a cord which is worn around one's neck or other appendage and has attached to it a small object such as a key, knife or whistle. The purpose of using a lanyard is to provide the user ready access to a particular object even though he may be involved in an active endeavor. Wearing a lanyard around one's neck frees that person's hands and pockets so that he is unburdened during his activity.

Lanyards are generally simple devices. Lanyard fixtures secure the ends of the cord together and provide a mounting means for the object.

Heretofore, lanyards have generally required two or even three separate fixtures, all requiring individual handling in the assembly process. In particular, an object mounting device such as a hook has required the lanyard cord to be threaded through it. Additionally, an optionally present slide loop is frequently fitted about the cord to be movable thereon to adjust the effective size of the loop of the cord that is disposed about the neck or other appendage of the user. Finally a ferrule or the like is crimped about the ends of the cord to secure them in a loop or about the cord adjacent the mounting device to limit its movement along the length of the cord.

It will be readily appreciated that these many assembly steps contribute significantly to the manufacturing cost of a relatively simple device. The present invention is intended to eliminate most of these steps to provide a low cost lanyard.

SUMMARY OF THE INVENTION

The present invention is directed to a lanyard that satisfies the needs set forth above. The lanyard comprises a unitary lanyard fixture made of a resilient plastic having a base section made up of a bottom, a cap and a hinge. The base section further has means for mounting an element to the lanyard fixture and an internal recess with cord piercing prongs extending from the recess. The cap also has piercing prongs and is foldable into a closed position onto the bottom to grasp the cord and secure it to the fixture. The lanyard fixture further has a locking indentation and a cooperable clamping hook integral with it for holding the cap closed against the bottom. A hollow slider section has an opening through which the lanyard cord passes and is connected by a frangible bridge section to the base section.

In one aspect of the invention, the slider section of the lanyard fixture has a slider base and slider cap connected by a hinge. The slider further has additional locking means for locking the slider cap in a closed position on the slider base.

In another aspect of the invention the mounting means on the lanyard fixture is a hook or a ring.

In another aspect of the invention, the lanyard fixture further has a flexible cord received in the recess in the base.

These and other features, aspects, and advantages of the present invention will become better understood with regard to the following description, appended claims, and accompanying drawings.

BRIEF DESCRIPTION OF THE DRAWINGS

FIG. 3 is a sectional view taken along the line 3—3 in FIG. 1;

FIG. 4 is a sectional view taken along the line 4—4 in FIG. 2;

FIG. 5 is sectional view taken along the line 5—5 in FIG. 2;

FIG. 6 is a sectional view taken along the line 6—6 in FIG. 1; and

DESCRIPTION OF THE PREFERRED EMBODIMENT

Figure 1:
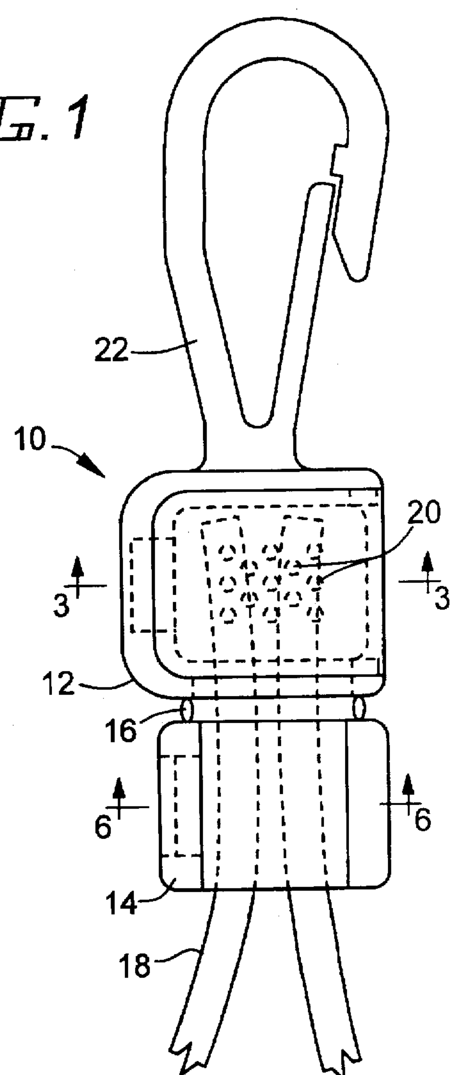
FIG. 1 is a front elevational view of one embodiment of the invention in a fully assembled state.

A lanyard fixture 10 is shown generally in FIG. 1. The lanyard fixture 10 is made of resilient plastic and has a base section 12 integral with a slider section 14. The slider section 14 is a loop connected to the base section 12 by a frangible connection 16 which can be a thin plastic web or strand or any other releasable connection that holds the base section 12 to the slider section 14.

Two ends of a flexible cord 18 made of fabric or the like are secured within the lanyard fixture 10 and extend through the slider section 14. The flexible cord 18 is secured within the base section 12 by cord piercing prongs 20. Integral mounting means 22 project from the base section 12 to secure an object to the lanyard. FIG. 1 shows the mounting means 22 to be a snap hook, though any variety of mounting means can be utilized.

Figure 2:
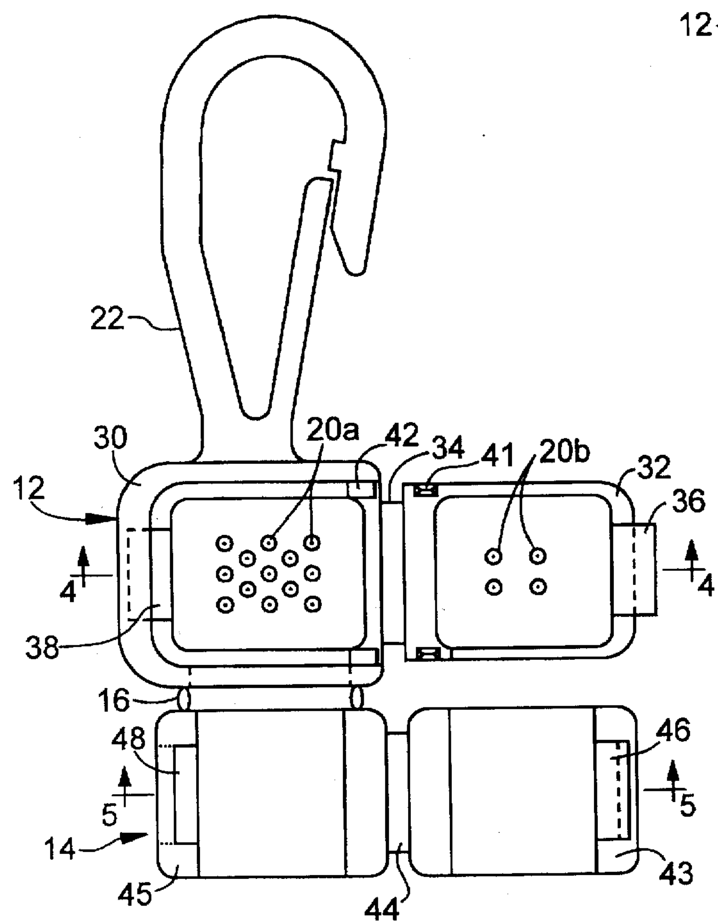
FIG. 2 is a front elevational view of the invention before assembly of a lanyard cord thereto.

FIG. 2 shows the base 12 having a bottom 30 from which the mounting means 22 extends and to which the frangible connection 16 is attached. A cap 32 is hingedly connected to the bottom 30 of the base section 12 by a hinge 34 defined by a thin web of the plastic of which fixture 10 is formed that extends between the bottom 30 and the cap 32. The hinge 34 is flexible and allows the cap 32 to fold over the bottom 30. The cord piercing prongs 20 project from both the bottom 30 and the cap 32 of the base section 12. The number and arrangement of the prongs 20 can vary with different embodiments. In the preferred embodiment, three rows of three prongs **20*a* are disposed in a square arrangement on the bottom 30 of the base 12. Four prongs 20*b* extend from the cap 32 in a corresponding square pattern and are disposed such that when the cap 32 closes over the bottom 30, the cap prongs 20*b* nest between the bottom prongs 20*a*. From FIG. 3 it can be seen that the cord piercing prongs 20*a* and 20*b* extend toward each other in parallel to pierce the ends of the flexible cord 18 to secure the cord 18 to the base 12**.

The cap 32 is locked in its closed position by a hook 35 cooperating with a locking indentation 38 in a wall of the bottom 30. The hook 35 and locking indentation 38 are located on the cap 32 and bottom 30 respectively, each on the sides thereof furthest from the hinge 34. The hook 35 extends upward from the cap 32 and is wedge shaped having a wedge face 35 and a locking face 37. The locking indentation 38 is a gap in a wall on the bottom 30 for receiving the hook 36 when the base 12 is in a closed position. When the cap 32 closes on the bottom 30 the wedge face 36 strikes the wall defining the locking indentation 38 of the bottom 30. As force is applied to close the cap 32 over the bottom 30, the hook 35 bends to allow the wedge face 36 to cam into the locking indentation 38 until the wedge face 36 clears a hook retaining lip 39 on the locking indentation 38. When the hook 35 clears the lip 39, the resilient hook 35 snaps into a locking position wherein the locking face 37 abuts the locking lip 39 of the locking indentation 38 to secure the cap 32 in a closed position on the bottom 30 of the base 12.

The cap 32 and bottom 30 have means to guide the cap portion 32 into proper dosed alignment with the bottom 30. In one version of the invention this means includes one or more projections 41 on the cap 32 and corresponding alignment pockets 42 on the bottom 30. When the cap 32 is closing, the cap projections 41 enter the alignment pockets 42, thus aligning the cap 32 on the bottom 30.

The slider 14 is shown in FIG. 2 to have a slider cap 43 hingedly connected to a slider bottom 45. A slider hinge 44, constructed identically to the hinge 34, connects the slider cap 43 and the slider bottom 45 such that the slider cap 43 bends at the slider hinge 44 to close over the slider bottom 45, as seen in FIGS. 5 and 6. The resulting closed slider 14 has a through opening that allows the flexible cord 18 to extend therethrough. The slider 14 has locking means to hold the cap 43 in a closed position on the bottom 45. In one version of the invention, the locking means is a slider hook 46 on the slider cap 43 that lockingly cooperates with a slider locking indentation 48 on the slider bottom 45 when the slider is in a closed position and is constructed in a manner substantially identical to that described above for the hook 35 and indentation 38. In FIG. 6 it can be seen that the hollow slider section 14 is snug to but is not locked on the flexible cord 18, and is therefore slidable along the flexible cord 18.

The lanyard fixture 10 as shown in FIG. 2 can be produced in a single production run. All parts are made of the same resilient plastic. When the lanyard fixture 10 comes off a production run, both ends of the flexible cord 18 can be inserted to the open base 12 and open slider 14. These portions fold into a locked position to construct a lanyard having a looped flexible cord 18.

Figure 7:
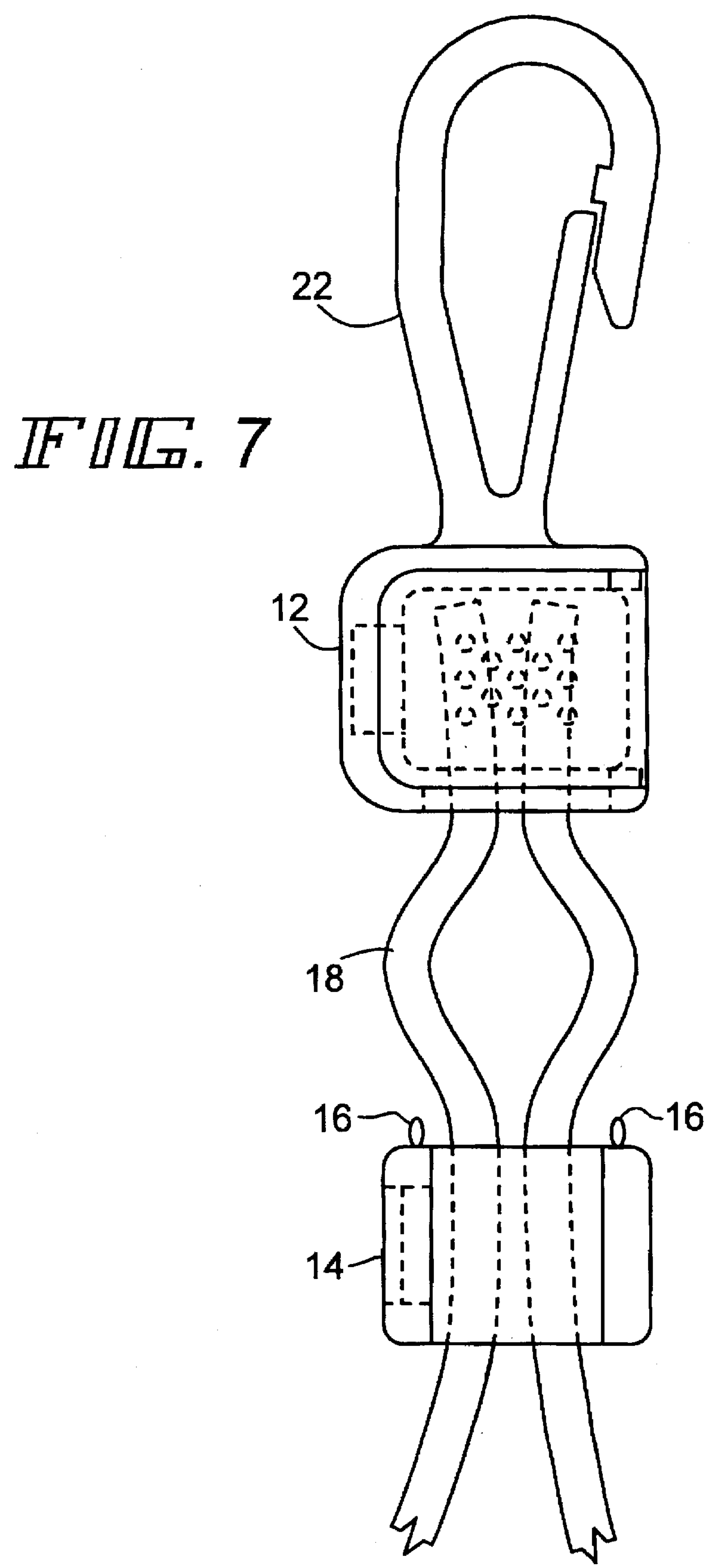
FIG. 7 is a front elevational view of a preferred embodiment of the invention showing a slider separated from the lanyard fixture.

In order for the slider 14 to adjust the loop formed by the flexible cord 18, the frangible connection 16 must be broken. This connection 16 can be broken by applying a slight force separating the slider 14 from the base 12. As shown in FIG. 7 after this connection 16 has been broken, the slider 14 is slidable on the flexible cord to adjust the cord loop size.

From the foregoing, it can be seen that the described lanyard fixture offers simplicity and reliability by combining the features of several fixtures into one integral device that can be produced in a single manufacturing operation.

I claim:

1. A lanyard comprising:

(a) a base section having cord securing means;

(b) a slider section having an elongated recess;

(c) means releasably connecting said base and slider sections; and (d) a cord disposed in a loop and extending through the elongated recess of the slider section and into said cord securing means so that the cord is secured to the base section by the cord securing means.

2. The lanyard of claim 1 wherein said base section comprises:

a bottom having cord securing means mounted thereto;

a cap having cord securing means mounted thereto; and a hinge connecting said bottom and said cap.

3. The lanyard fixture of claim 2 wherein said cord securing means are projections extending from each of said bottom and cap toward the other.

4. The lanyard fixture of claim 1 wherein said slider section further comprises:

a slider base;

a slider cap;

a slider hinge connecting said slider base and slider cap.

5. The lanyard fixture of claim 4 wherein said slider section elongated recess is a through opening formed between said slider cap and said slider base.

6. A lanyard fixture for securement to a lanyard strand of flexible material, comprising:

a base including mounting means for connection to an element to be secured to the lanyard fixture and having an internal recess open on two sides and first strand piercing prongs within said recess and directed toward one of said two sides, and a first lock formation on said base;

a locking cap hingedly mounted on said base and having second strand piercing prongs and adapted to close said one side of said recess with said second strand piercing prongs entering said recess, said cap further including a second lock formation cooperable with said first lock formation to secure said cap in a position closing said recess one side; a slider defining sleeve adjacent the other of said two sides and having a thru opening extending to said other side so that a lanyard strand may be passed through said opening into said recess to be impaled on the prongs therein; and, a flangible connection releasably securing said sleeve to said base.

7. The lanyard fixture of claim 6 wherein said slider further comprises:

a slider base;

a slider cap;

a slider hinge connecting said slider base and slider cap; and additional locking means for locking said slider cap in a closed position on said slider base.

8. A unitary lanyard fixture for securing a strand of cord to a lanyard comprising:

a base section having a bottom portion made of a resilient plastic including, mounting means for connection to an element to be secured to the lanyard fixture ind haying internal recess open on two sides and first strand piercing prongs within said recess, a cap portion having second strand piercing prongs extending therefrom, said cap portion being adapted to fold into a closed position wherein one of said open sides is closed and wherein said cap portion folds to align with said base section such that said first and second strand piercing prongs project towards each other and enmesh, a hinge portion disposed between and integral to said base and said cap portion, such that said cap portion folds along said hinge portion to be in said closed position, a locking indentation on one of said base section and said cap portion, and a clamping hook cooperable with said locking indentation to secure said said closed position and mounted on the other of said base section and said cap portion;

a hollow slider section adjacent the other of said sides having a through opening extending to said other side so that a lanyard strand may be passed through said opening into said recess to be impaled on the prongs therein; and a frangible bridge section made of at least one tie of said plastic releasably securing said slider section to said base section.

9. The lanyard fixture of claim 8 wherein said slider section further comprises:

a slider base;

a slider cap;

a slider hinge connecting said slider base and slider cap; and additional locking means for locking said slider cap in a closed position on said slider base.

10. The lanyard fixture of claim 8 wherein said mounting means is a hook.

11. The lanyard fixture of claim 8 wherein said mounting means is a ring.

12. The lanyard fixture of claim 8 wherein said base section further having means for aligning said cap portion on said bottom portion in said closed position.

13. The lanyard fixture of claim 12 wherein the means for aligning comprise a projection on said cap section and a corresponding pocket on said bottom portion.

* * * * *